June 25, 1935.  C. FIELD  2,005,736
ICE
Original Filed Aug. 14, 1931   7 Sheets-Sheet 1

INVENTOR.
CROSBY FIELD
BY
Blair Curtis + Dunne
ATTORNEYS

June 25, 1935.  C. FIELD  2,005,736
ICE
Original Filed Aug. 14, 1931  7 Sheets-Sheet 5

INVENTOR.
CROSBY FIELD
BY Blair Curtis + Dunne
ATTORNEYS

June 25, 1935.  C. FIELD  2,005,736
ICE
Original Filed Aug. 14, 1931   7 Sheets-Sheet 7

INVENTOR.
CROSBY FIELD
BY
ATTORNEYS

Patented June 25, 1935

2,005,736

UNITED STATES PATENT OFFICE

2,005,736

ICE

Crosby Field, Brooklyn, N. Y., assignor to Flakice Corporation, Wilmington, Del., a corporation of Delaware Original application August 14, 1931, Serial No. 557,108. Divided and this application September 13, 1934, Serial No. 743,893

11 Claims. (Cl. 62—1)

This invention pertains to products of manufacture of a type in which a solid is congealed from a fluid, the solid product being formed with particular regard to its physical characteristics. An ice product has here been selected to illustrate an example of the type of product embodying the invention.

This application is a division of my application Serial No. 557,108, and is co-pending therewith. The invention of application Serial No. 557,108 relates to heat exchange apparatus of the type in which a coating of brittle material is formed upon and subsequently removed from a deformable member through which the exchange of heat occurs for causing the brittle material to form thereon. In its present employment the invention relates more particularly to ice making apparatus wherein the ice is formed upon a thin flexible sheet, such as a cylinder, which is subsequently flexed to cause peeling of the ice therefrom.

The terms "water" and "ice" as employed in the specification and claims are used generically and are intended to include liquids other than water capable of being congealed and solid refrigerants other than ice capable of being congealed from liquids.

It is an object of the present invention to provide improved product of manufacture which will be particularly suitable for commercial requirements.

The nature and further objects of the invention will be apparent to those skilled in the art from the following description of one embodiment of a machine and process for manufacturing the product, from the description of an embodiment of an ice product and from the accompanying drawings.

In the drawings:

Figure 5 is an enlarged transverse vertical section taken on the line 5—5 of Figure 1;

The present apparatus in general comprises a thin flexible cylinder journaled for rotation within a vessel containing water maintained at a level slightly below the top of the cylinder. Brine or another suitable refrigerating medium is circulated through a drum located within the cylinder, and is forced from the drum in submerged jets against the inner surface of the cylinder, causing ice to form very rapidly upon that part of the outer surface of the cylinder which is submerged in the water.

The thin wall of the cylinder which extends above the water level is deflected by suitable mechanism to alter the normal radius of curvature of the cylinder at that point, and thereby cause the ice which is formed thereon during rotation of the cylinder in the water to peel from the cylinder above the water level in long sheets or ribbons which break off and pass down a chute into a suitable receptacle or storage bin. Substantially the normal curvature of the cylinder beneath the water level is maintained so that ice may form thereon without cracking during rotation of the cylinder.

The peeling of the ice above the water level permits the production of a drier and colder ice in long sheets or ribbons which may be passed directly from the cylinder to storage bins, thus avoiding the necessity of recovering the ice from the water in the vessel and accelerating and reducing the cost of production.

The drum for circulating the brine substantially fills the interior of the cylinder and acts as a guide therefor. Such an arrangement simplifies the construction of the machine and reduces its cost of production and maintenance.

Foundation and tank

Figure 4:
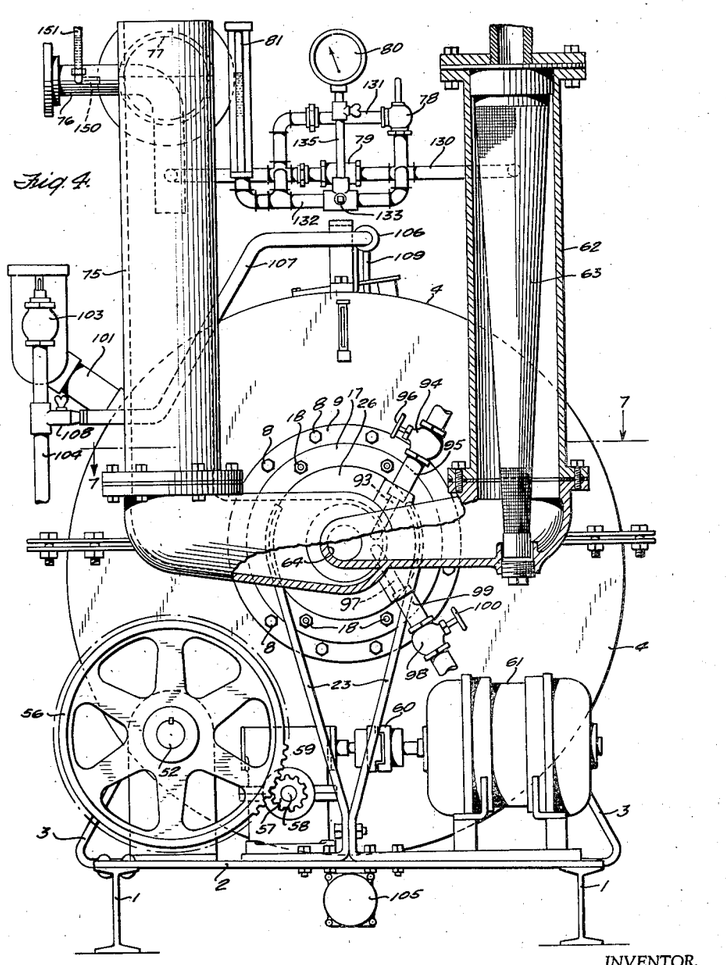
Figure 4 is an enlarged end elevation seen from the left in Figure 1.
Figures 5, 14:
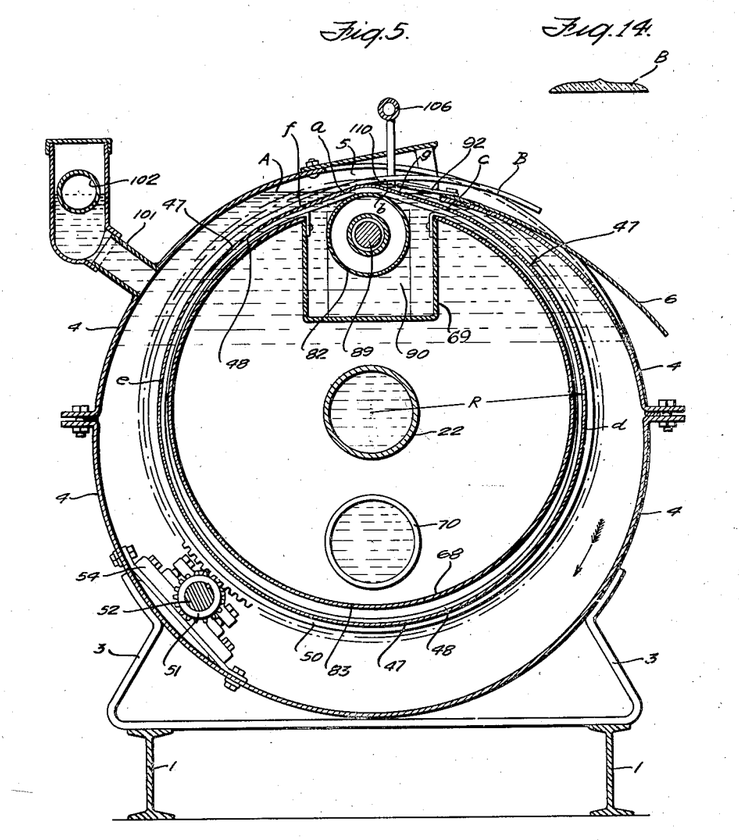

At the bottom of Figure 4 are shown foundation beams 1, 1 connected by a foundation plate 2, which beams and plate support the entire machine. Secured to the foundation beams 1, 1 are suitably formed brackets 3 to support a cylindrical tank 4 which is adapted to receive and hold the water, and in which the freezing cylinder rotates. Tank 4 is formed in two sections, as shown, to facilitate the installation and removal of the freezing cylinder and associated mechanism. As shown in Figure 5, the upper section of the tank 4 is provided at the top and intermediate its ends with longitudinal openings 5 to permit the peeled ice to pass out of the tank onto a chute 6 supported by the tank 4 and leading to a storage bin (not shown).

Freezing cylinder assembly

Figure 3:
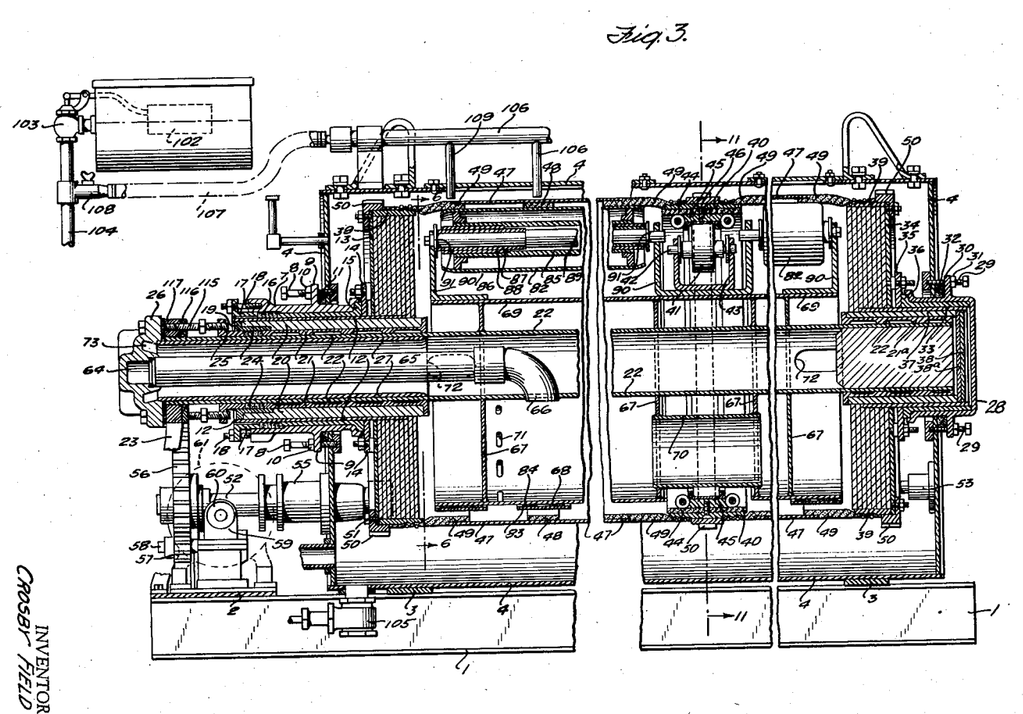
Figure 3 is an enlarged longitudinal central vertical section of the water tank and freezing cylinder.

Referring to the left hand side of Figure 3, the front end wall of the tank 4 is provided with a central opening to receive a bored hub 7 which is secured to the end wall of the tank by bolts 8 which pass through a flange 9 of hub 7 and are locked thereto by nuts 10. Interposed between the tank end wall and the flange 9 is a gasket 11 which may be in the form of rubber tubing to prevent leakage of water from the tank.

Hub 7 forms a surrounding bearing for a hollow stub shaft 12 welded at its inner end to a disc-shaped head 13 which closes one end of and rotatably supports the freezing cylinder hereinafter described. Endwise adjustment of head 13 and hub bearing 7 is effected by thrust plate 14 carried on head 13 by suitable studs, nuts and spacing collars. The plate 14 bears against a babbitt 15 interposed between the bearing 7 and the shaft 12. Leakage between the shaft 12 and its bearing is prevented by packing 16 placed in an annular recess in the bearing hub and held by a pack gland 17 adjustably secured to the hub 7 by studs 18.

Shaft 12 is secured to a packing sleeve 19. Interposed between shaft 12 and sleeve 19 is a bushing 20, preferably of impregnated wood to provide a heat insulated bearing surface. The interior surface of bushing 20 rides upon a journal 21, which is fitted closely and secured to a hollow shaft 22 extending centrally and longitudinally of the machine through the tank 4 and freezing cylinder. The hollow shaft 22 is fixed against rotation by torque arms 23 (see Figure 4) bolted to a flange on the shaft and to the fundation plate 2. The shaft 22 serves as a circulating medium for the brine as hereinafter described.

Leakage between bushing 20 and journal 21 is prevented by packing 24 interposed between sleeve 19 and shaft 22 and held by a pack gland 25 adjustably secured by right and left hand screws 115 to a clamp ring 116 bolted to a flange 117 on shaft 22.

Bolted to flange 117 of shaft 22 is an end casting 26 provided with ports for the ingress and egress of the brine. Secured to the inner surface of the shaft 22 and extending beneath the bearings heretofore described is a sleeve of insulating material 27 to protect the bearings against the action of the brine in the shaft 22.

Turning now to the right hand side of Figure 3, the back end wall of the tank 4 is also provided with a central opening to receive a bored hub bearing 28 secured to the end wall of the tank by bolts 29 which pass through a flange 30 of hub 28 and are locked thereto by nuts 31. Interposed between the tank end wall and the flange 30 is a gasket 32 which may be in the form of rubber tubing to prevent leakage. Hub bearing 28 is closed exteriorly of the tank, as shown.

Hub 28 forms a surrounding bearing for a hollow stub shaft 33 welded at its inner end to a disc-shaped head 34 which closes that end of the freezing cylinder. Endwise adjustment of head 34 and hub bearing 28 is effected by a thrust plate 35 carried on the head 34 by suitable studs, nuts and spacing collars. The plate 35 bears against a babbitt 36 interposed between the bearing 28 and the shaft 33.

Shaft 33 rotates on a journal 21a secured to the shaft 22. Interposed between the shaft 33 and the journal 21a is a bushing 37 preferably of impregnated wood which rotates with the shaft 33 and the journal 21a. Welded or otherwise tightly fastened to the end of the shaft 33 is an end plate 38 to prevent leakage of the brine into the water tank. Inside the plate 38 is secured a heat insulating disc 38a.

Cylinder construction

Figure 1:
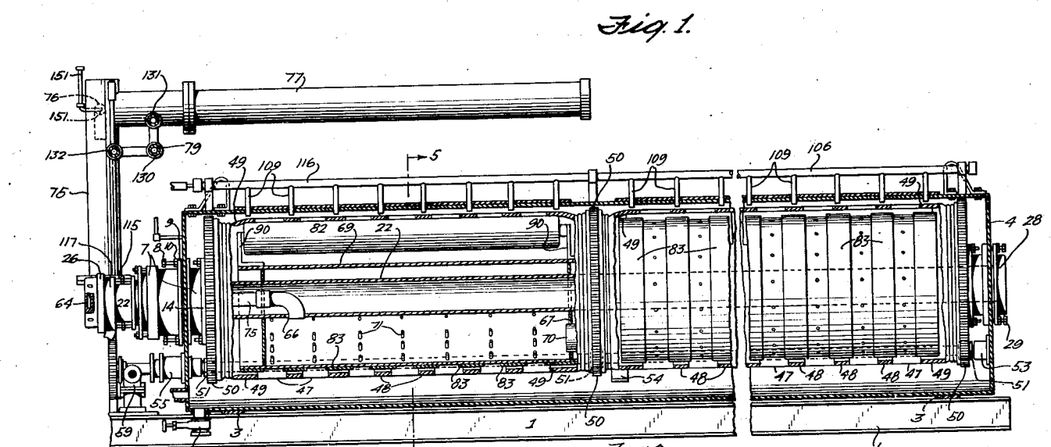
Figure 1 is a side elevation partly in section of an assembled machine capable of manufacturing a product embodying the invention.
Figure 2:
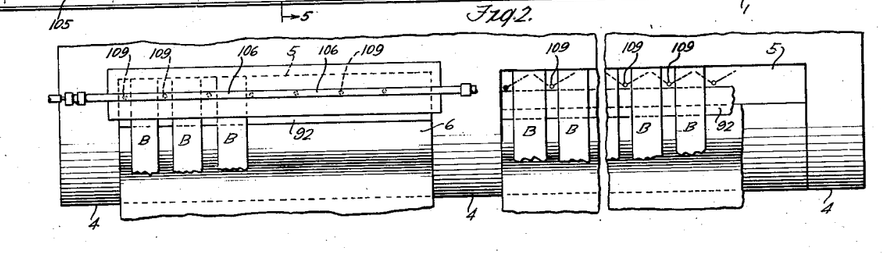
Figure 2 is a partial plan view of the top of the assembly and showing the manner in which the strips of ice embodying the invention are peeled from the freezing cylinder.

As shown in Figures 1 and 3, the illustrative cylinder is made in two sections which are secured to and supported by end rings 39 and a center ring 40. End rings 39 are welded respectively to heads 13 and 34 to rotate therewith, and center ring 40 rotates on rollers 41, of which there are three, spaced equal distances apart about the interior periphery of the ring 40. Top roller 41 rotates on a shaft 42 supported by a bracket 43 supported by a wall of the interior guide drum hereinafter described. The other rollers 41 each rotate on a shaft 42 supported by castings 42a secured to center plates 67, which are in turn supported by shaft 22. The inner surface of ring 40 is insulated with a rubber strip 44, and bearing against the strip 44 is a track 45 to ride on the rollers 41, the track 45 and strip 44 being secured to the ring 40 by screws 46.

Each section of the cylinder is preferably made up of a plurality of very thin edge-to-edge arranged sheets 47 of metal having great flexibility and strength which are secured together by interior circumferential strips 48 of fabric reenforced rubber and longitudinal lock seams and a strip of rubber. The outer ends of the cylinder thus formed are provided with other fabric reenforced rubber aprons 49, which are secured to the end and center rings respectively by wire strands wound over the thin ends of the aprons 49 to bind them into circumferential grooves formed in the end and center rings.

The strips 48 and the end aprons 49 are of substantial thickness for the dual purpose of providing heat insulation to prevent formation of the ice beneath the edges of the metal sheets which would tend to separate the metal from the rubber and of providing tracks for the cylinder guiding and deflecting means presently to be described. For a more detailed description of the freezing cylinder, reference is made to applicant's co-pending application, filed August 14, 1931, Serial No. 557,107, directed particularly to the freezing cylinder and its manufacture.

Cylinder driving mechanism

Referring to Figures 1 and 3, each end ring 39 and center ring 40 carries a gear 50 secured thereto by studs, nuts or screws. Gears 50 are rotated by pinions 51 (see Figure 5) carried by a jack shaft 52 which extends within and lengthwise of the tank 4 and is journaled on the back end of the machine in bearing 53 (see Figure 1), centrally of the machine in bearing 54, and at the front end of the machine in jack shaft box and gland 55, said bearing members being secured to the walls of the tank 4, as shown.

Referring to the left hand side of Figure 3, the end of shaft 52 which extends out of the tank 4 carries a gear 56, which meshes with a pinion 57 carried on a shaft 58 of a reduction gear 59 which is connected by a flexible coupling 60 (see Figure 4) to a motor 61. The reduction gear and the motor are suitably supported on the foundation plate 2.

The parts thus far described are sufficient for the observation that if the water level in the tank is maintained at the line A in Figure 5 ice will be formed from the water contacting with the outer surface of the cylinder below the line A if a cold producing medium such as brine is circulated through the interior of the cylinder. And further, that since the cylinder is capable of rotation upon its own axis, the brine may be projected to all points along its interior surface by fixed nozzles, if desired. The mechanism for circulating the brine through the cylinder will now be described.

Brine circulating system

Referring to Figure 4, cold brine under pump pressure enters the machine through a pipe 62 provided with a strainer 63, then through a port 64 in casting 26 (see Figure 3), into pipe 65 which extends into hollow shaft 22, and passes through an opening 66 formed in the side of shaft 22. The brine passes out of the open end of pipe 65 into a hollow drum located within the freezing cylinder. The drum is formed in two sections, one on either side of the center ring 40. Each section of the drum consists of end walls 67 (see Figure 3), a peripheral wall 68 (see Figure 5), and a U-shaped wall 69 for a purpose hereinafter described. The end walls 67 which close the ends of the sections of the drum are welded or otherwise securely fastened to central shaft 22 so as to rigidly fix the drum against rotation. The two sections of the drum are connected by a pipe 70 located near the bottom of the drum to permit the brine to flow from one section of the drum into the other, thus providing in effect a single drum.

Figure 6:
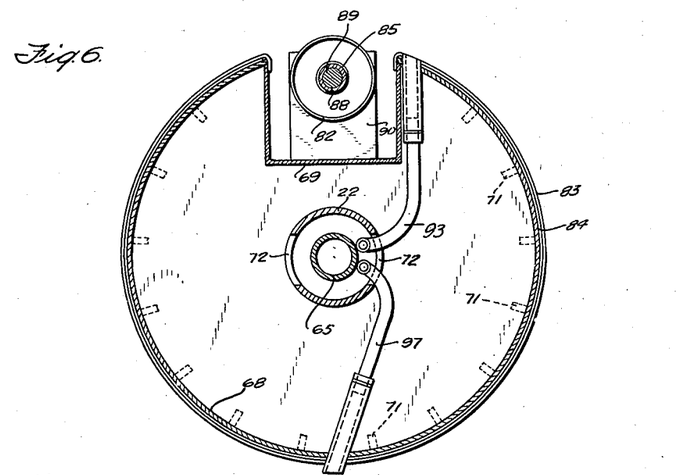
Figure 6 is a transverse vertical section taken on the line 6—6 of Figure 3; certain parts being omitted for clearness of illustration.
Figure 7:
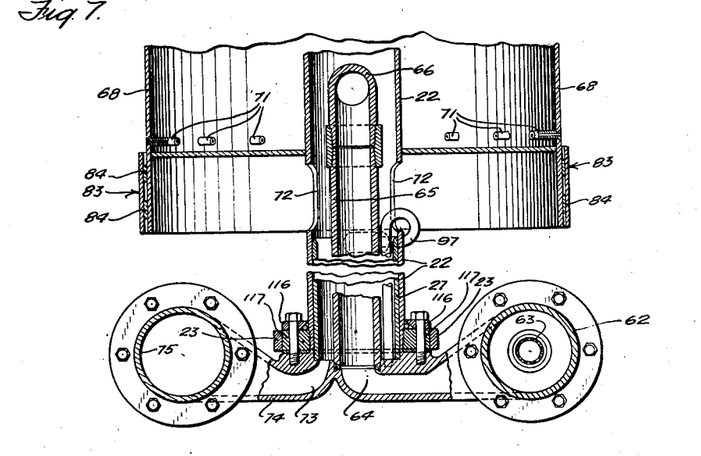
Figure 7 is a horizontal section taken on the line 7—7 of Figure 4.

Referring to Figures 6 and 7, the peripheral wall 68 of the drum is provided with a plurality of openings, each provided with a nozzle 71 through which the brine in the drum is projected at high velocity against the inner surface of the metal sheets 47 of the cylinder. In the illustrative machine (see Figure 1) the nozzles 71 for each metal sheet 47 of the cylinder are located in line with the center line of the sheet and equidistant from the edges of adjacent rubber strips 48. Such an arrangement of the nozzles produces a modification of the invention such as the strip of ice having the cross-sectional formation shown in Figure 14, i. e., having an upper surface which is raised at the center and tapers downwardly toward each side of the strip. The nozzles 71 may be so located as to cause the formation of strips having other cross-sectional formations or having a uniform thickness throughout. The cross-sectional from of strip shown in Figure 14 has advantages in handling and storing the ice for some purposes because the varying thickness and irregular contour of a strip has a tendency to prevent two strips from adhering to each other. The nozzles 71 preferably extend inwardly some little distance from the wall of the drum, and the nozzle inlet is preferably located at the innermost end of the nozzle to permit any small amount of solid matter in the brine to settle without obstructing the inlet to the nozzles. During the operation of the machine the drum is kept filled with cold brine which is constantly projected against the inner surface of the freezing cylinder through the nozzles 71. The brine which is sprayed into the cylinder flows to either end thereof and passes into hollow shaft 22 through openings 72. The brine entering shaft 22 through openings 72 passes out of the shaft through a port 73 in casting 26, thence through the exit end 74 of casting 26 (see Figure 4) and into a return pipe 75, from which it is drawn through an outlet turn tube 76 welded into the side of pipe 75. From turn tube 76 the brine flows through suitable piping (not shown) to a brine cooling apparatus (not shown). Return pipe 75 is open at the top so that the pressure against the cylinder due to the hydrostatic head of the brine may be controlled. Entering turn tube 76 is a Pitot tube 150 provided with a glass indicator 151. The lower end of Pitot tube 150 faces the outflowing brine and causes the indicator 151 to indicate the volume of brine passing out of the turn tube 76. Pitot tube also functions to prevent the brine from siphoning out of the machine when shut down, by admitting air into turn tube 76 and breaking the siphon.

Provision is made to care for the increase or decrease in the volume of the brine due to variations in the temperature of the brine. As shown at the top of Figure 1, a brine storage tank 77 is connected to the brine return pipe 75 above the lower end of turn tube 76. Tank 77 preferably takes the form of a long horizontal pipe and may be supported by brackets (not shown) from the ceiling of the room or building. Tank 77 functions as a storage space for an excess amount of brine. The arrangement is such that under normal conditions the brine will half fill the tank 77. Should the temperature of the brine be lowered, causing a reduction in the volume of the brine in circulation, a portion of the brine in the storage tank will be drawn into circulation and the level of the brine in the tank will be lowered. Should the temperature of the brine be increased, causing an increase in its volume, the excess volume will find room in tank 77. The proportions are such that a considerable variation in the volume of the brine may take place without unduly raising or lowering the level of the brine in the storage tank 77.

Referring to Figure 4, safety valve connections are interposed between the inlet brine pipe 62 and the outlet brine pipe 75 to care for any excess brine pressure which might be developed. As there shown, pipe 62 is connected to pipe 75 by a pipe 130 having by-pass pipes 131 and 132 connected thereto. Pipe 130 is provided with a check valve 79 and pipe 132 is provided with a three-way cock 133 normally turned to prevent passage of brine from inlet pipe 62 to outlet pipe 75. Pipe 131 carries a safety valve 78 adapted to open under excess pressure and permit the brine to flow from the inlet pipe 62 directly into the outlet pipe 75 through pipe 131.

Check valve 79 is adapted to interrupt any back siphoning of the brine through inlet pipe 62 by admitting air into pipes 130 and 62 when the level of the brine in outlet pipe 75 falls below the open end of pipe 130.

For observing the brine pressure a gauge 80 is provided which is connected to pipe 132 by a pipe 135.

A sight glass 81 may also be provided for observing the level of the brine in tank 77.

*Mechanism for guiding and deflecting the freezing cylinder to form ice thereon and peel it therefrom*

It is clear from the foregoing description that the cylinder rotates past jets of cold brine issuing from the nozzles 71, which causes a continuous layer of ice to form on the metal sheets of the cylinder as they move through the water in the tank 4. This ice formation clings to the cylinder with great tenacity so long as the cylinder retains its normal shape, but is readily removed if the cylinder is deflected sufficiently from its normal shape. Because the ice will peel from the cylinder at any point where the cylinder is sufficiently deflected and because it is desirable to peel the ice only at the top of the cylinder where it projects above the water level in the tank, provision is made to maintain substantially the normal shape of the cylinder at points below the water level where the ice is forming thereon, and to deflect that portion of the cylinder which extends above the water level to cause peeling of the ice at that point only. The deflecting mechanism is also designed to remain in constant deflecting position at the top of the cylinder, so that as the cylinder rotates a substantially continuous peeling of ice from the cylinder will occur at that point and the ice will be peeled off in long strips or ribbons and pass onto the chute 6 for delivery to a storage bin. The cylinder guiding and deflecting mechanism in its illustrated embodiment will now be described.

As shown in Figure 5, the cross-sectional form of the cylinder is controlled by the peripheral wall 68 of the drum and by a deflecting roller 82. The exterior of wall 68 of the drum is provided with a plurality of strips 83 of the Monel metal or other resistant material of sufficient width to permit the rubber strips or tracks 48 of the cylinder to bear thereagainst. Interposed between the strips 83 and the wall 68 is a resilient packing 84 or other suitable means for adjusting the contour of the strips 83. The rubber strips 48 of the cylinder contact with and slide upon the strips 83 of the drum except at and adjacent to the bottom of the drum, at which point a slight space intervenes between the strips 83 on the drum and the strips 48 on the cylinder, thus permitting a free flow of the brine longitudinally of the cylinder at its bottom. Thus it will be seen that the drum by its contact with the cylinder maintains substantially the normal curvature of the cylinder below the water level while the ice is being formed thereon. Such an arrangement insures the production of ice which is free of cross-cracking.

As shown in Figure 5, deflecting roller 82 is located in the space formed by the U-shaped wall 69 of the drum. Roller 82 is located a sufficient distance above the axis of rotation of the cylinder to raise and deform the cylinder at this point, i. e., above the water level A. As shown in Figure 3, roller 82 is supported upon a spider pipe 85 by means of spacers 86 secured thereto by set screws. Spider pipe 85 rotates on bushings 87 interposed between the pipe 85 and a sleeve 88 carried by a roller shaft 89. The sleeves 88 at either end of the shaft provide anti-friction bearings for the bushings 87. The shaft 89 is held in brackets 90 secured to U-shaped wall 69 of the drum. End play of shaft 89 is cared for by plate washers 91. A roller 82 mounted as described is provided for each section of the drum.

As best shown in Figure 5, the drum 68 and the deflecting roller 82 cause the freezing cylinder to take a general shape as follows: section $a$ to $b$ assumes the curvature of the deflecting roller 82; section $b$ to $c$ assumes almost a straight tangent to the point of tangency $c$ with the cylinder; section $c$ to $d$ assumes the curvature of the drum; section $d$ to $e$ assumes an elliptical shape depending upon the relative pressure and weight of the brine and fluid within the cylinder and the water between the cylinder and the tank; section $e$ to $f$ assumes the curvature of the drum similar to the curvature of section $c$ to $d$; and section $f$ to $a$ assumes the curved tangent similar to section $b$ to $c$. As a result of this configuration of the cylinder, when it is rotated in the direction indicated by the arrow in Figure 5 and with the water maintained at level A, the water in the cylinder begins to freeze at the point marked $g$. The ice remains, however, quite flexible, because of its extreme thinness from points $g$ to $d$, and continues to build up and thicken until it assumes a rigid shape having a definite curvature of radius "R" shown in Figure 5. Due to the curvatures of the section $a$ to $b$, the ice peels off between the points $a$ and $b$ in long strips which pass onto a plate 92 secured to the tank 4 and thence onto the chute 6, down which they slide into a storage bin. The peeled strips are caused to break off at intervals when the end of a strip comes in contact with the chute 6.

*Air vent and brine drainage for the cylinder*

Mechanism is provided to permit the escape of air from the freezing cylinder when the brine is initially run into the machine preparatory to starting it, and when it is desired to drain the cylinder of brine after a run. A drain for the brine is also provided. Such mechanisms are best shown in Figures 4, 6 and 7.

Referring to Figure 6, an air vent tube 93 is provided having an opening near the upper inner surface of the cylinder. Tube 93 passes into hollow shaft 22 through one of the openings 72, thence through the shaft 22 to the front end of the machine where the tube 93 (see Figure 4) is connected to a valve 94 by a nipple 95. Valve 94 may be opened or closed by a hand wheel 96.

A brine drainage tube 97 is provided having an opening near the lower inner surface of the cylinder. Tube 97 passes into hollow shaft 22 through one of the openings 72, thence through the shaft 22 to the front end of the machine where tube 97 (see Figure 4) is connected to a valve 98 by a nipple 99. Valve 98 may be opened or closed by hand wheel 100.

In normal operation of the machine valves 94 and 98 are both closed. To drain the brine from the cylinder both valves are opened. If there is no brine in the drum when the machine is started, air vent valve 94 is opened until the normal amount of brine has entered the drum, then valve 94 is closed.

Water regulation

Since the level of the water in the tank 4 is to be maintained below the top of the freezing cylinder and since the body of water in the tank is constantly being used up in the formation of ice which is removed, it is necessary to replenish the water supply and it is desirable that the additional water be added gradually and constantly so that the water level in the tank may remain substantially the same at all times.

As shown particularly in Figures 4 and 5, water is supplied at one side of the tank by an inlet pipe 101 controlled by a float 102 and a control valve 103, a well being provided for the float if desired to protect it. Water is fed from a source of supply to the inlet pipe 101 through a pipe 104.

At another point near the top of the tank an over-flow pipe (not shown) may be located to insure the maintenance of the water level below the top of the freezing cylinder. At the bottom of the tank a drain cock 105 is provided to remove all the water from the tank when desired.

Water spray for peeled ice

As shown in Figure 5, the strip of ice B peels from the freezing cylinder above the water level A. The under surface of the ice so peeled and which has been in contact with the freezing cylinder is colder than the upper surface of the ice which has been in contact with the water in the tank. Thus the temperature of the under surface of the peeled ice is considerably below 32° F., while that of the upper surface is only slightly below the freezing point. As heretofore pointed out, ice thus peeled in the air is drier and colder than ice which has been peeled in the water and warmed by the water to a temperature slightly below freezing, and such dry cold ice has many advantages for some purposes. However, for other purposes a wet and less cold ice is desirable. Provision is therefore made to spray the under side of the peeled ice with water as it is peeled from the freezing cylinder to produce, when desired, the same character of ice as would be produced by peeling the ice while submerged in the water of the tank.

Figure 8:
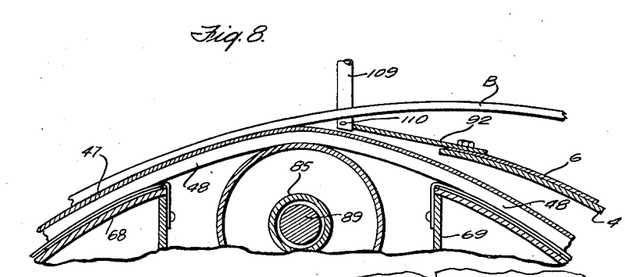
Figure 8 is an enlarged vertical section of the top of the water tank and freezing cylinder showing the manner of spraying and peeling a strip of ice embodying this invention.
Figures 9, 10:
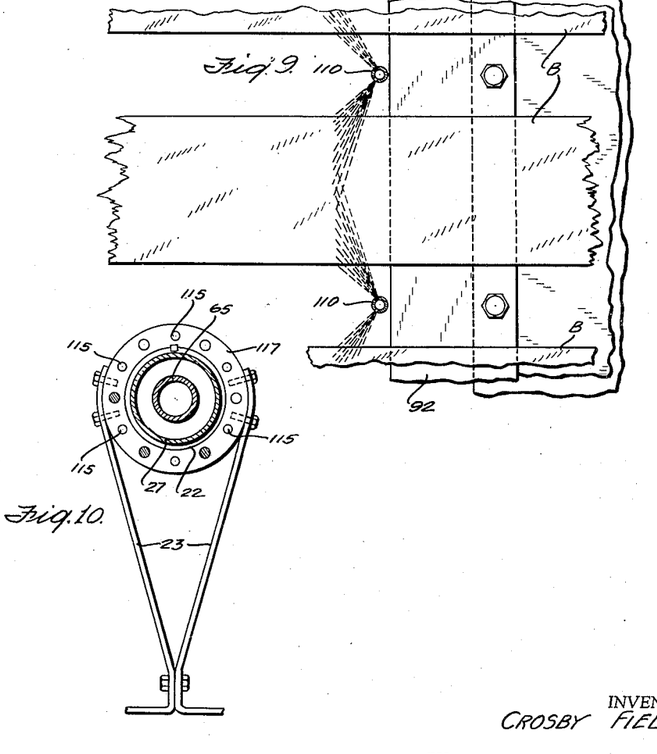
Figure 9 is a top plan view of the same.
Figure 10 is an enlarged partial end view seen from the left in Figure 1 and showing the torque arms for preventing rotation of the central shaft.
Figures 11, 12, 13:
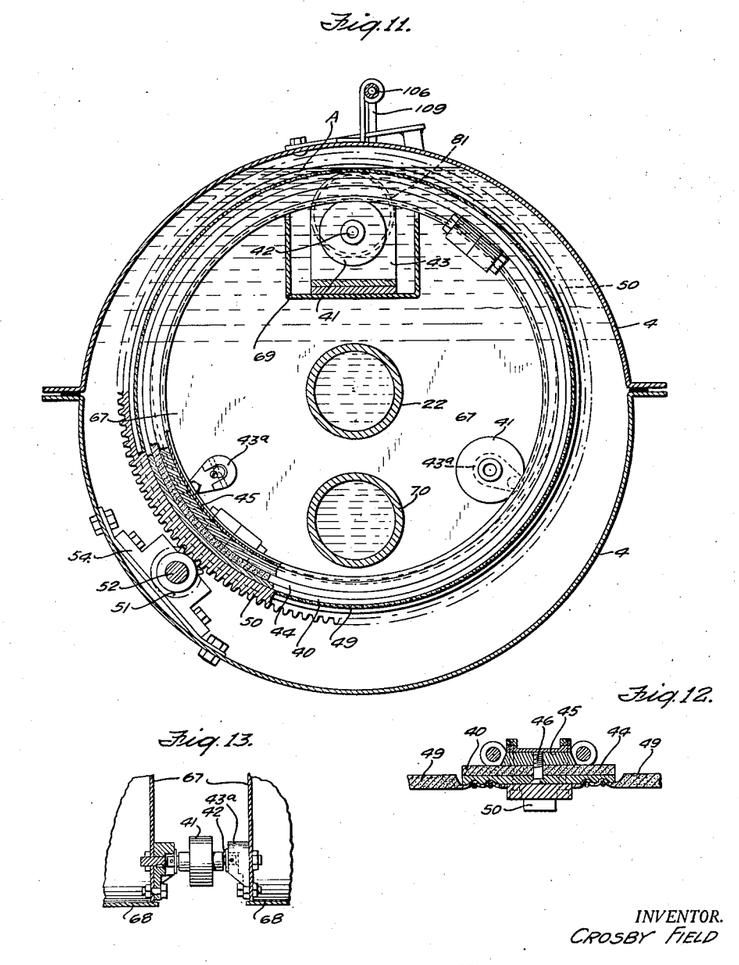
Figure 11 is a transverse vertical section taken on the line 11—11 of Figure 3; certain parts being omitted for clearness of illustration.
Figure 12 is an enlarged sectional view of a portion of the central cylinder ring and showing the attachment of the cylinder thereto.
Figure 13 is an enlarged detail of one of the rollers for the center ring and its mounting; and, Figure 14 is a cross-section of a form of ice strip embodying the invention and which may be produced on the machine shown.

Referring to Figure 4, a pipe 106 extends lengthwise the tank 4 directly above the point where the ice is peeled from the freezing cylinder. Water is supplied to pipe 106 from source supply pipe 104 through a connecting pipe 107. The flow of water through the pipe 107 is controlled by a valve 108. Extending downwardly from the pipe 106 and between each sheet of peeled ice is a spray pipe 109 provided with orifices 110 (see Figure 8) formed and directed to spray water upwardly against the under side of the peeled ice, as clearly shown in Figure 9. A portion of the water sprayed on the under side of the ice freezes thereon and adds to the thickness of the ice. Thus it will be seen that when valve 108 is opened the water will flow from source supply pipe 104 through pipe 107 into pipe 106, and down through spray pipes 109 and out through orifices 110 against the under side of the peeled ice. When a dry cold ice is desired, valve 108 is closed. When a wet warmer ice is desired valve 108 is left open during the operation of the machine.

It should be noted at this point that while provision is made for producing either dry or wet ice, both forms of ice are peeled from the cylinder above the level of the water in the tank and pass directly from the cylinder onto a chute which delivers the ice to a suitable receptacle or storage bin; also that the thickness of the peeled ice may be controlled by the speed of rotation of the cylinder or by the coldness of the brine or by the pressure of the brine.

For clarifying the ice which is frozen on the cylinder the water in the tank 4 may be agitated while freezing by compressed air introduced into the water through nozzles (not shown) located in the tank at a series of spaced points about the cylinder. The nozzles are preferably located adjacent the surface of the cylinder to reduce the amount of compressed air required.

The operation of the machine will be apparent from the foregoing description without further amplification. The machine in operation will make ice much more rapidly and efficiently than is possible with the usual types of ice making machines. Either dry or wet ice may be produced in long strips or ribbons which are delivered directly from the cylinder to a suitable receptacle or storage bin. The ice produced may be of uniform thickness or of variable thicknesses as desired, and free from cross-cracking. It has been found that strips of ice thus formed break up into pieces which have a greater tendency toward uniformity of size and shape than pieces of ice formed by the breaking up of wider strips or sheets; and for this reason the strips of ice as described have been found to produce a product of greater commercial value.

While several embodiments of the invention have been described with particularity it is to be understood that the invention is not meant to be limited thereby, but may have numerous other embodiments within the scope of the appended claims.

I claim:

1. As a product of manufacture, pieces of ice, each piece having a first surface curved about at least one axis and having a predetermined radius, and a second surface opposite said first named surface curved about a plurality of axes, whereby the surfaces of one piece piled with other pieces will contact with surfaces of the other pieces over a minimum area.

2. A product of manufacture consisting of dry free-flowing pieces of completely congealed water having two slightly curved concentric surfaces of unequal radii.

3. A product of manufacture consisting of thin strips of a completely congealed liquid, the side edges of each strip being symmetrical.

4. As an article of manufacture, a formed strip of frozen liquid being substantially uniformly curved along its longitudinal center line and being substantially straight between the side edges thereof, and the cross section of said strip being substantially thicker at the longitudinal center line than at the side edges thereof.

5. As an article of manufacture, a formed strip of frozen liquid being substantially uniformly curved along its longitudinal center line, and the cross section of said strip being substantially thicker at the longitudinal center line than at the side edges thereof.

6. A product of manufacture consisting of pieces of ice broken from thin, curved strips of sub-cooled ice, said strips having a cross section one boundary of which is a straight line.

7. A product of manufacture comprising individual pieces of sub-cooled ice each piece being relatively thin and having only two principal exposed surfaces and materially less extensive edge portions joining said principal surfaces whereby the ratio of surface area to mass is increased to provide greater surface for heat transfer, at least one of said principal surfaces having adjacent portions out of rectilinear alignment to reduce the areas of contact between contiguous pieces, said pieces having approximately uniformity of size.

8. A product of manufacture comprising individual pieces of sub-cooled ice, each piece being relatively thin and having only two principal exposed surfaces and materially less extensive edge portions joining said principal surfaces whereby the ratio of surface area to mass is increased to provide greater surface for heat transfer, at least one of said principal surfaces being curved to reduce the areas of contact between contiguous pieces, said pieces having approximately uniformity of size.

9. A product of manufacture comprising individual pieces of sub-cooled ice, each piece being relatively thin in comparison with its lateral dimensions and the corresponding sides of individual pieces being generally similar in surface configuration, and adjacent portions of at least one side of each piece being out of rectilinear alignment.

10. A product of manufacture comprising individual pieces of sub-cooled ice, each piece being relatively thin in comparison with its lateral dimensions, and the corresponding sides of the individual pieces being generally similar in surface configuration and one side of each piece being curved.

11. A product of manufacture comprising pieces of sub-cooled ice broken from strips of sub-cooled ice, said strips having adjacent portions of one side thereof out of rectilinear alignment, and the side edges of said strips being symmetrical whereby the pieces broken from said strips have approximate uniformity of size.

CROSBY FIELD.